Oct. 29, 1957     J. PAVELKA     2,811,188
EGG OPENER
Filed Sept. 14, 1955
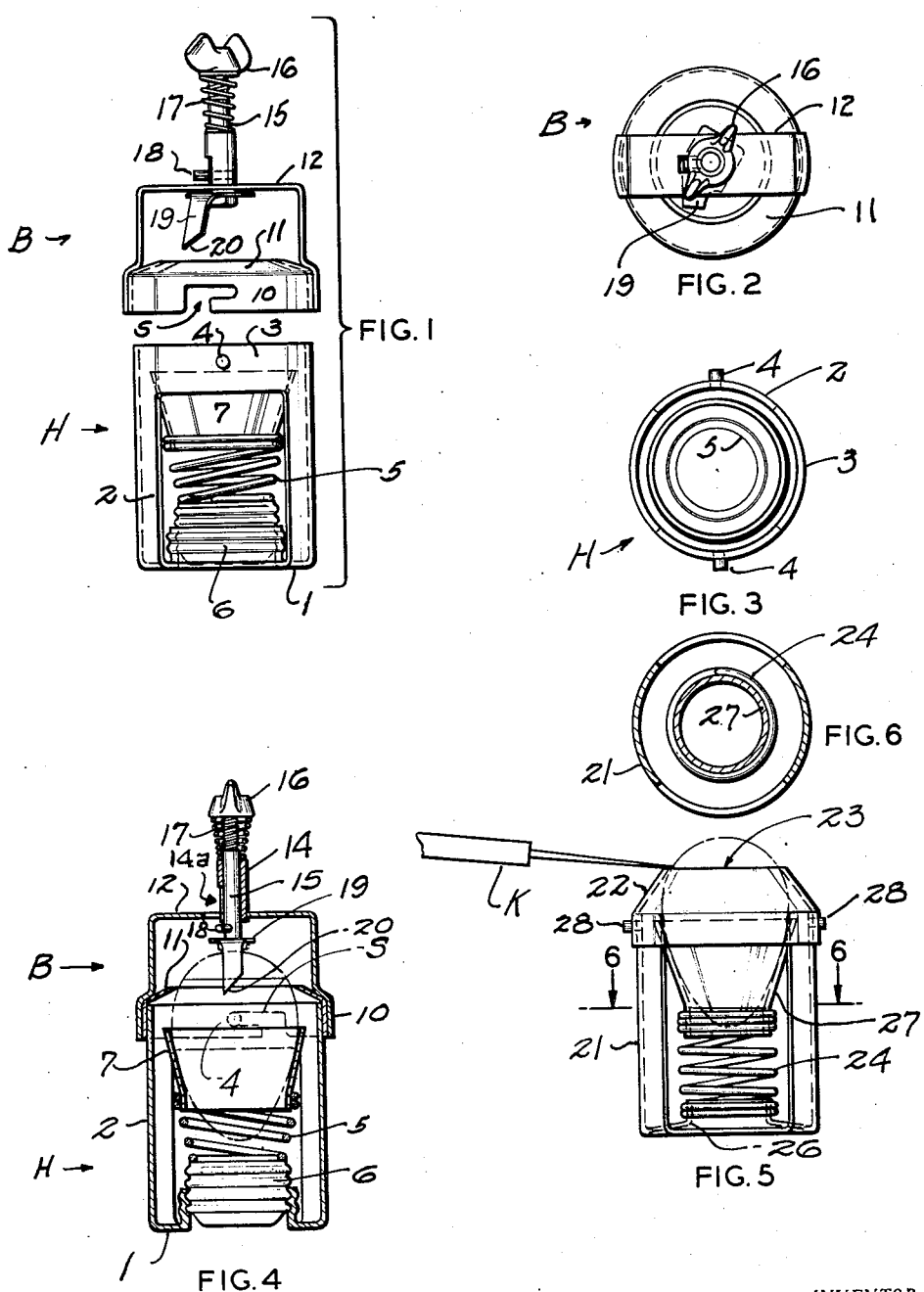
INVENTOR.
Joseph Pavelka
BY Rodney Bedell
atty.

2,811,188

EGG OPENER

Joseph Pavelka, St. Louis, Mo.

Application September 14, 1955, Serial No. 534,289

5 Claims. (Cl. 146—2)

The invention relates to egg openers such as are used in the kitchen or at the table when the end of an uncooked or soft boiled egg is to be cut away from the remainder of the egg.

The main object of the invention is to provide a simple effective device whereby the end portion of the egg may be cut cleanly from the remainder of the egg without the likelihood of unduly shattering the egg shell or accidentally spilling the egg content or messing the fingers.

The invention comprises a housing for holding the egg and a cap which guides a cutting knife which may be held by the user or may be mounted upon the cap and held mechanically in a functioning position while being moved by the user.

In the accompanying drawings illustrating selected embodiments of the invention, Figure 1 is an exploded side view of an egg-receiving housing and cap applicable thereto but spaced above the same.

Figure 2 is a top view of the cap.

Figure 3 is a top view of the housing.

Figure 4 is a transverse vertical central section of the housing and the cap assembled with an egg positioned therein.

Figure 5 is a side view illustrating another form of the invention.

Figure 6 is a horizontal section on line 6—6 of Figure 5.

The housing H shown in Figures 1–4 is indicated as a cylindrical cage having a bottom 1 and an apertured side 2 with an upper rim 3, provided with lateral lugs 4. An upright helical spring 5 is seated on a shouldered adjusting plug 6 threaded into the housing bottom 1 and its upper end mounts a funnel-like egg support 7.

The cap B includes a rim 10 slightly larger in diameter than housing rim 3 and provided with L-shaped slots S arranged to cooperate with lugs 4 to form bayonet joints whereby the cap and housing are readily secured to each other or detached from each other. The cap has an upper wall 11 provided with an aperture large enough to permit the passage of the end portion of an egg, but small enough to limit the movement of the egg through the aperture to the end portion only.

An inverted U-shaped yoke 12 has the lower ends of its legs secured to the cap. The yoke mounts a tubular bushing 14 which journals a vertical shaft 15. A wing nut 16 is fixed to the upper end of the shaft. A coil spring 17 is compressed between the nut and the upper end of bushing 14 and yieldingly supports the shaft in the position shown in Figure 1. A pin 18 projects laterally from the shaft through a slot 14a in bushing 14 when the shaft is in the position shown in Figure 1. A knife blade 19 is fixed on the lower end of shaft 15 and extends laterally and then downwardly from the shaft and includes an upright cutting edge and a downwardly directed point 20. The shaft and knife may be pressed downwardly against the thrust of spring 17 to bring pin 18 beneath the underside of yoke 12 where upon slight rotation of the shaft the pin and knife will be retained in lowered position.

To use the device an egg is seated on funnel 7, the cap is applied to engage the top of the egg and pressed downwardly and rotated to engage the bayonet joint elements S, 4 to complete the assembly as shown in Figure 4. Shaft 15 is then pressed downward to thrust the point of knife blade 19 through the shell and the blade is then rotated 360° to sever the egg shell along the line of the top face of the cap which serves as a guide for the knife. When the rotating blade and shaft brings pin 18 into alignment with slot 14a, spring 17 raises the knife. Cap 10 may be rotated to free it from lugs 4 and to detach it from the housing and the upper end of the egg may be removed. The contents of the egg may be removed with a teaspoon, using the housing as an egg cup, or the major portion of the egg may be removed from the housing and placed in an egg cup or otherwise disposed of.

Figures 5 and 6 show a simpler form of the invention in which the housing 21 and cap 22 correspond generally to the parts previously described, but the cap terminates with the annular edge 23 which serves as a guide for an ordinary knife K held in the hand of the user, whereby the top part of the egg may be severed from the remainder of the egg by a stroke of the knife blade parallel to edge 23 or by inserting the point of the knife through the egg shell and then making a circular cut around the egg.

The lower end of spring 24 has a snug sliding fit over an upturned rim 25 on the housing base 26. When cap 22 is removed, spring 24 and funnel 27 may be grasped readily by fingers inserted through the openings in the side of the housing, and removed from the housing for cleaning all the parts. The upper rim of the funnel is spaced a short distance from the side of the housing but is close enough to hold the egg upright until cap 22 is applied and secured by the insertion of pins 28 into the slots in the cap as previously described.

In both forms of the device, the egg is firmly but gently held in place and the shell may be cut cleanly and accurately without unintentional breakage of the shell generally and without cutting or sawing the ends of the user's fingers.

Some of the details of the invention, such as the adjustment plug 6 and the funnel 7, may be omitted if desired and other variations in details may be made without departing from the spirit of the invention and the exclusive use of those modifications coming within the scope of the claims as contemplated.

What is claimed is:

1. An egg opener comprising an upright housing, a yielding spring supported in the lower portion of the housing, a cap readily secured to and removable from the upper end of the housing and having an upper wall with a central opening adapted to accommodate the passage therethrough of the upper portion of an egg seated on the spring, an inverted U-shaped yoke on the cap and projecting upwardly therefrom, an upright shaft journaled in the yoke axially of the housing, and a knife having a blade offset from said axis and rotatable by said shaft adjacent to the periphery of said opening.

2. An egg opener according to claim 1 in which the shaft is movable axially in the yoke, and a spring thrusts the shaft and knife upwardly relative to the yoke, there being bayonet joint elements on the yoke and shaft for holding the shaft in a lowered position throughout the major portion of a revolution of the shaft.

3. An egg opener according to claim 2 in which the knife consists of an L-shaped blade extending laterally from the shaft and then downwardly with an upright cutting edge projectible below the periphery of the cap opening when the shaft is shifted downwardly.

4. An egg opener according to claim 1 which includes an adjustable mounting for the spring in the bottom of the housing for varying the effective height of the spring support to better accommodate different sizes of eggs.

5. A device of the class described comprising an upright housing open at its upper end, and having an upright slot in its side wall substantially from bottom to top, an upright coil spring seated on the bottom of the housing, the housing having an inturned portion in the base thereof supporting and centering said spring, an egg support mounted on the upper end of said spring and thrust upwardly by the spring toward the housing open upper end and comprising a funnel shaped to receive the lower portion only of an egg, a relatively shallow cap covering only the upper end portion of the housing and being firmly seated thereon, there being readily detachable interengaging elements on the housing and cap for holding them assembled in a fixed relation, the cap having a central aperture directly above said funnel and adapted to accommodate the projection therethrough of the upper portion of an egg carried on said funnel support, the highest portion of the upper face of the cap constituting the boundary of the aperture and forming a knife support and guide surface, the device being unobstructed above said cap so that said knife support and guide surface is visible to the user of the device.

References Cited in the file of this patent

UNITED STATES PATENTS

| 499,081 | Anderson | June 6, 1893 |
| 746,505 | Haslam | Dec. 8, 1903 |
| 962,293 | Anderson | June 21, 1910 |

FOREIGN PATENTS

| 870,890 | Germany | Mar. 19, 1953 |